Figure 1:
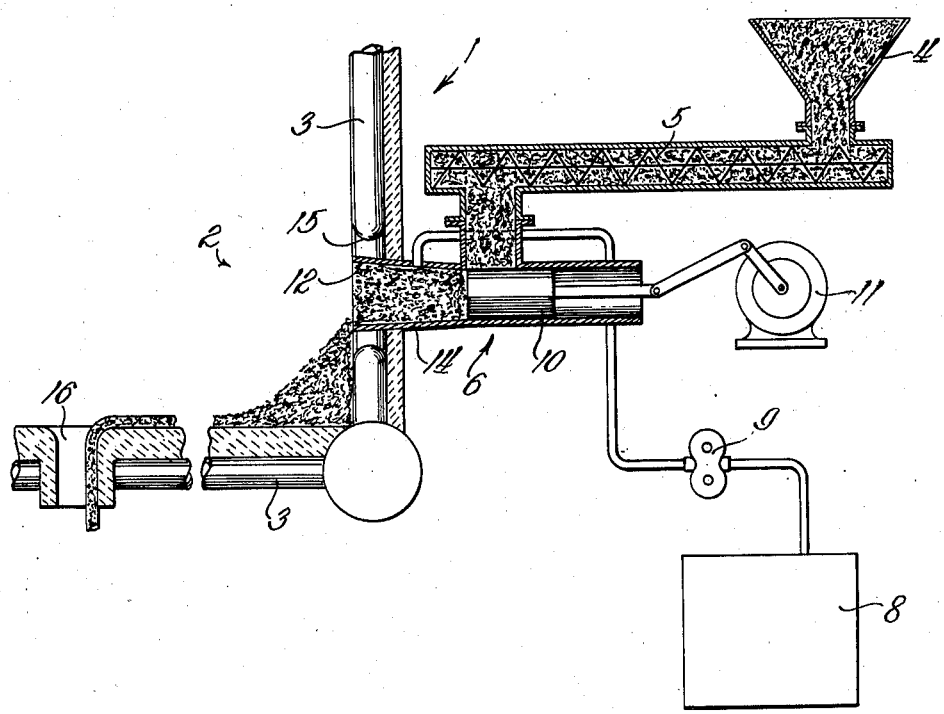

Feb. 24, 1942.   R. E. H. JAMES   2,274,414
METHOD OF DISPOSING OF FLY ASH
Filed Nov. 4, 1940

Inventor:
Ralph Ernest Hawets James

Patented Feb. 24, 1942

2,274,414

UNITED STATES PATENT OFFICE 2,274,414

METHOD OF DISPOSING OF FLY ASH

Ralph Ernest Haweis James, Chicago, Ill.

Application November 4, 1940, Serial No. 364,213

1 Claim. (Cl. 110—165)

The present invention relates to a method of disposing of fly ash which is a product of combustion resulting from the burning of pulverized fuels, such as pulverized coal.

The burning of pulverized fuels has come into widespread use in recent years particularly in the operation of electric generating stations for the generation of steam to drive the electric generators. The waste flue gases resulting from the combustion of pulverized coal include a large percentage of fly ash suspended in the gases in the form of extremely small solid particles, because of which the discharge of these gases into the air, particularly in urban sections, is objectionable. Suitable devices for separating the fly ash from the flue gases are known in the art, but the problem of disposing of the recovered fly ash is troublesome due to certain of its physical characteristics. For example, fly ash in its recovered form has little bearing value and therefore is not adaptable for use in filling in land. Further, its disposal in lakes or streams would pollute the water and hence is not permitted in most communities.

In order to overcome these objections it has been the practice in the art to remelt the fly ash in the furnace into a more readily disposable form. However, this method as practiced today has several disadvantages. If the fly ash is fed back into the furnace in a dry condition, a large amount of the fly ash will be caught by the draught of the furnace and will again be drawn up with the waste gases into the stacks. This method is further objectionable in that melting of the fly ash uses up a certain amount of furnace heat and reduces the efficiency of the furnace. In order to prevent the dry fly ash from being drawn into the stack, it has been proposed to mix the fly ash with water and then introduce the mixture into the furnace, but this has proven only partially successful. This latter method further reduces the efficiency of the furnace since in addition to melting the fly ash, the water must also be vaporized which imposes an additional heat load.

It is the object of my invention to overcome the above noted objections by feeding the fly ash together with a combustible material, preferably oil, into the furnace. I have found that by using oil, the fly ash will not be drawn up the stacks and, in addition, the oil will be ignited and provide heat additional to that of the furnace, to melt the fly ash. Further, the oil acts as a reducing agent to reduce any ferric oxide that may be present in the fly ash to ferrous oxide, which fuses at a much lower temperature, and thus facilitates fusion of the fly ash.

Now, in order to acquaint those skilled in the art with the manner of utilizing my invention, I shall describe in conjunction with the accompanying drawing specific embodiments of my invention.

Figure 2:
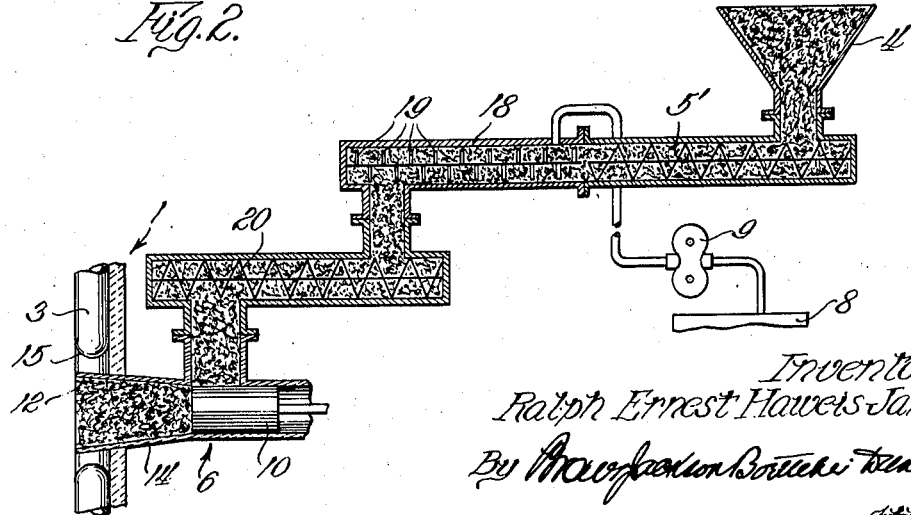

In the drawing:

Figures 1 and 2 are schematic illustrations of suitable apparatus for use with my invention.

In Figure 1, a portion of a boiler 1 is shown diagrammatically for purposes of illustration and it will be understood so far as my invention is concerned that it may represent a furnace, or an integral furnace boiler of the type now in use in most modern electric generating stations. In the latter type of boiler, the flame burns in a large rectangular room 2 which is surrounded by water tubes 3 on the sides and floor with the steam generating or liberating tubes being disposed overhead, the latter not being shown in the drawing. The tubes 3 at the bottom of the furnace are covered with a suitable refractory to form the furnace floor and the vertical tubes 3 are covered with a suitable insulating material to form the side walls. Pulverized fuel, generally pulverized coal, is burned in this type of boiler for generating steam. In the combustion of these pulverized fuels, a large quantity of fly ash is suspended in the waste gases which fly ash, as already noted, is objectionable and should be removed from the waste gases before discharge thereof into the atmosphere. That may be accomplished by any suitable means such, for example, as an electrostatic separator of known type.

Now, in order to render the fly ash more readily disposable, I propose to feed it back into a furnace or the like and remelt it, after which it may be removed as slag. The slag may be used for making mineral wool or it may be solidified and used as a fill.

The recovered fly ash is dumped into a hopper 4 and conveyed by a screw conveyor 5 to a chamber 6 into which a combustible material, preferably oil, is also fed from a supply tank 8 by means of a suitable oil pump 9. A cylindrical plunger 10 is disposed in the chamber and is adapted to be reciprocated therein by means of an electric motor 11 to intermittently force a charge of fly ash and oil through the open end 12 of the chamber into the furnace. The chamber is preferably positioned so that it opens into one side wall of the furnace a short distance above the floor thereof. The outlet portion 14 of the chamber 6 should preferably be frusto-conical in shape with the diameter gradually increasing toward the open end 12, in order to assure that the fly ash and oil may be easily ejected and avoid possible jamming of the plunger in the chamber 6.

In most modern integral furnace boilers in use today, the vertical water tubes are placed close together and as a consequence thereof a circular opening of sufficient extent to inject an appreciable charge of the fly ash and oil cannot be made. Since I have found that an opening, as described above, is preferable, two vertical adjacent boiler tubes may be bent away from each other for a portion of their length, as at 15, to provide a space of sufficient extent therebetween to accommodate a circular opening, as shown in the drawing. It will be obvious that the opening into the furnace may be otherwise suitably made, for example, the outlet portion of the chamber into which the fly ash and oil is fed may be divided into two narrow columns, each of which may be passed between adjacent vertical tubes of the boiler without altering the latter.

When a charge of fly ash and oil is fed into the furnace, as above described, the oil will be instantly vaporized and ignited by the heat of the furnace, the heat of which, together with the heat generated by the combustion of the oil, will cause fusion of the fly ash. The fused fly ash will intermix with the slag of the furnace and may be withdrawn therefrom through the slag tap hole 16 formed in the bottom of the furnace floor.

By introducing combustible oil with the fly ash, I have found that little or none of the fly ash will be drawn into the stacks by the draught of the furnace. It will also be obvious that additional heat for melting the fly ash is provided by the burning oil in the closest possible proximity to the fly ash so that the efficiency of the furnace will not be impaired. Combustible oil is also a reducing agent and since most fly ash contains ferric oxide in some degree, the latter will be reduced to ferrous oxide which fuses at a much lower temperature.

It will be seen that the fly ash and oil may be fed into chamber 6 at a predetermined rate by regulating the speed of conveyor 5 and oil pump 9, relative to that of the plunger 10, to provide and maintain the proper proportion of each ingredient of successive charges fed into the furnace.

As a modification of the present invention, I contemplate intimately mixing the fly ash with a combustible oil and then feed the mixture into the furnace. In Figure 2 I have shown an apparatus suitable for carrying out the modification, in which the conveyor 5' feeds the fly ash to a suitable mixing means 18 comprising a plurality of paddles 19 which may be actuated in any suitable manner. The oil is also fed into the mixing means 18 at the end adjacent conveyor 5' and is intimately mixed with the fly ash. A second conveyor 20 receives the mixture and conveys it to the chamber 6 from which the mixture is thrust into the furnace as in the previous embodiment of the invention.

While I have shown and described the preferred embodiments of my invention, it will readily be apparent to those skilled in the art that other modifications may be made therein without departing from the spirit and scope of my invention.

I claim:

The method of disposing of fly ash which comprises, mixing fly ash with combustible oil, delivering the mixture of fly ash and oil in a furnace combustion chamber adjacent the bottom thereof, igniting the mixture by heat generated in said chamber incident to the main combustion therein, burning the mixture separately from the main combustion of the furnace and thereby melting the fly ash to produce molten slag, maintaining the slag in molten condition by heat generated in said chamber, and drawing off the molten slag.

RALPH ERNEST HAWEIS JAMES.